(12) United States Patent
Hara

(10) Patent No.: US 8,832,275 B1
(45) Date of Patent: Sep. 9, 2014

(54) OFFLINE WEB BROWSER

(75) Inventor: Kentaro Hara, Tokyo (JP)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 13/436,077

(22) Filed: Mar. 30, 2012

(51) Int. Cl.
*G06F 15/173* (2006.01)
*G06F 17/30* (2006.01)

(52) U.S. Cl.
CPC .............................. *G06F 17/30902* (2013.01)
USPC ........................................................ 709/226

(58) Field of Classification Search
CPC ................................................ G06F 17/30902
USPC ........................................................ 709/226
See application file for complete search history.

(56) References Cited

U.S. PATENT DOCUMENTS

| | | | | |
|---|---|---|---|---|
| 6,182,122 | B1 * | 1/2001 | Berstis | 709/217 |
| 2005/0050172 | A1 * | 3/2005 | Redpath | 709/219 |
| 2010/0070448 | A1 * | 3/2010 | Omoigui | 706/47 |

OTHER PUBLICATIONS

Knapsack Problem (Wikipedia.org, Sep. 8, 2011).*
Bednyakov, Alexander, "Offline Explorer Pro 6.0: Setting Standard in Offline.Browsing," Free Articles by ArticlesBase.com, published Oct. 19, 2011, accessed at http://www.articlesbase.com/software-articles/offline-explorer-pro-60-setting-standard-in-offline-browsing-5319674.html, accessed on Oct. 9, 2012.
Harvey, Greg, "How to Use Offline Browsing in Internet Explorer 8," *For Dummies* . . . Dummies.com, published Nov. 2011, accessed at http://www.dummies.com/how-to/content/how-to-use-offline-browsing-in-internet-explorer-8.html, accessed on Oct. 9, 2012, John Wiley & Sons, Inc.
Van Fossen, Lorelle, "Web Browser Guide: Working Offline with Your Browser," The Blog Herald—www.blogherald.com, published May 31, 2007, accessed at http://www.blogherald.com/2007/05/31/web-browser-guide-working-offline-with-your-browser/, accessed on Oct. 9, 2012, Splashpress Media.

* cited by examiner

*Primary Examiner* — Vivek Srivastava
*Assistant Examiner* — Nicholas Celani
(74) *Attorney, Agent, or Firm* — Sterne, Kessler, Goldstein & Fox PLLC

(57) ABSTRACT

According to an embodiment, a system, a method and a computer-program product for managing resources on an offline browser. A client device receives a resource from a web server. The resource is included in a webpage. A hash is generated from a uniform resource identifier (URI) associated with the resource. The generated hash is mapped to a local file path of the resource. The local file path indicates the location of the resource in a disk storage. The resource is stored in the disk storage such that the resource is accessible by a hash when the client device subsequently cannot connect to the web server to download the resource associated with the URI.

25 Claims, 6 Drawing Sheets

OFFLINE WEB BROWSER

BACKGROUND

A user of a computing device uses a browser to access, download and view webpages stored on multiple web servers. To access, download and view webpages a browser requires a network connection to web servers over the Internet or the World Wide Web. When the network connection is unavailable or is slow, a user cannot view the requested webpages, even those webpages that a user has previously requested and viewed.

BRIEF SUMMARY

Embodiments disclosed herein include a system, method and a computer program product that allow a user to view previously downloaded webpages on an offline browser when the network connection is unavailable or is slow. A client device receives a resource to a web server. The resource is included in a webpage. A hash is generated from a uniform resource identifier (URI) associated with the resource. The generated hash is mapped to a local file path of the resource. The local file path indicates the location of the resource in a disk storage. The resource is stored in the disk storage such that the resource is accessible by a hash when the client device subsequently cannot connect to the web server to download the resource associated with the URI.

Embodiments disclosed herein also include a system, method and a computer program product that manage the number of webpages stored in in an offline browser. The least recently used webpages from a plurality of webpages stored in a disk storage of a client device that is associated with the offline browser are identified. The plurality of webpages include a plurality of resources. The least recently used webpages from the disk storage are removed to maximize the display of remaining webpages on the offline browser, such that the removal does not remove the resources that are also used in the remaining webpages. The removal identifies a resource count of the resource included in the least recently used webpages, decrements the resource count of a resource, and removes the resource when the resource count is below a predefined threshold.

Further features and advantages of the invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION

While the invention is described herein with references to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

Figure 1:
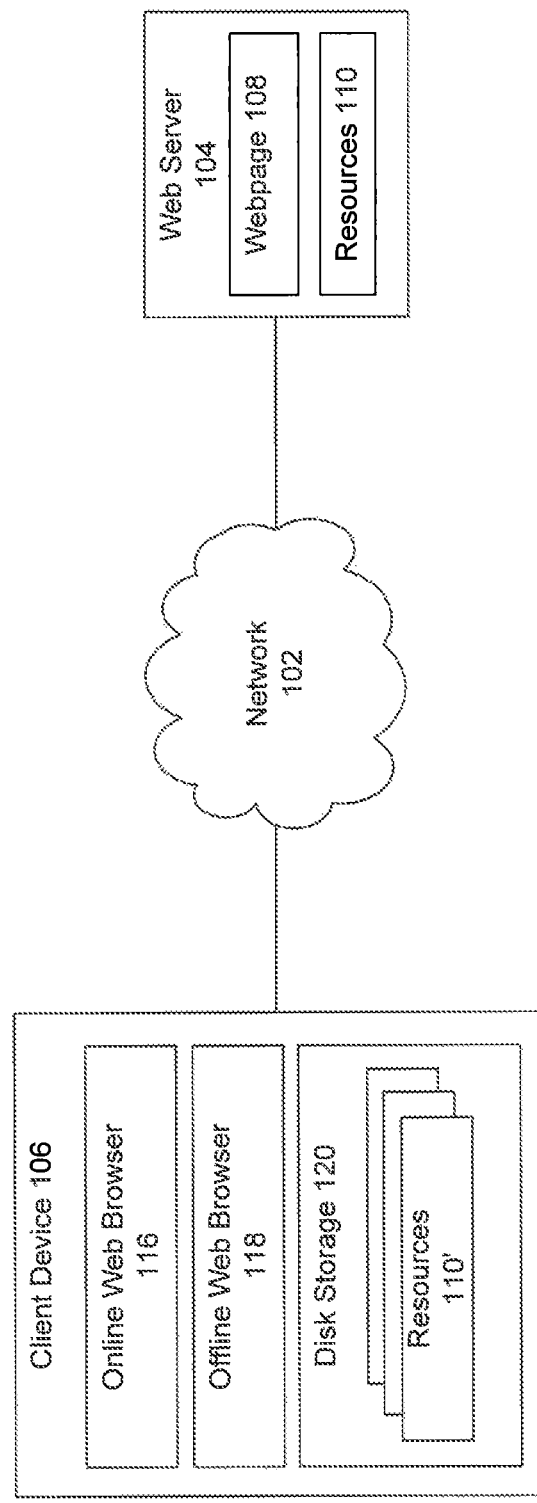
FIG. 1 is a block diagram of an exemplary environment that includes an offline web browser.

FIG. 1 is a block diagram of an exemplary system 100 of an environment that includes an offline web browser. System 100 includes a network 102, multiple web servers 104 and client devices 106. Network 102 connects client devices 106 to web servers 104.

Network 102 may be any network or combination of networks that can carry data communication. Such a network 102 may include, but is not limited to, a local area network, metropolitan area network, and/or wide area network, such as the Internet. Network 102 can support protocols and technologies including, but not limited to, World Wide Web protocols and/or services. Intermediate web servers, gateways, or other servers may be provided between components of the system shown in FIG. 1, depending upon a particular application or environment.

Web server 104 is an electronic device capable of sending, receiving and storing webpages 108. Webpage 108 is a document that is suitable for presentation and/or display using the World Wide Wet. Webpage 108 is stored on web server 104 and may be accessed using a web browser. When accessed, webpage 108 may be transmitted and displayed on client device 106.

Webpage 108 includes source code in a browser rendering markup language, such as HyperText Markup Language (HTML) or eXtensible HyperText Markup Language (XHTML). Webpage 108 may include resources 110 (described below). Additionally, webpage 108 may provide access to other webpages 108 using hyperlinks.

Webpage 108 may be a static webpage. A static webpage includes static text that is stored in a file system within web server 104 and is transmitted to client device 106 upon request. Example webpage 108 may include static webpages, such as Wikipedia, HTML specification and traditional webpages that browser 116 retrieves without using input parameters, described above.

Webpage 108 may also be a dynamic webpage. A dynamic webpage is constructed on web server 104 in response to a request generated by client device 106. Because a dynamic webpage is constructed in response to a request, dynamic webpage 108 may be generated from the input parameters provided in the request. Example dynamic webpages may include search results from a search engine, social networking websites, citizen journalism websites, dictionary searches, BBS log searches, etc. Other examples of dynamic pages may be pages whose document object model (DOM) structure may be manipulated using JavaScript. Some examples of content included in dynamic webpages are interactive buttons, such as "show more comments", "hide comments", etc. Typically, those buttons are implemented using GET queries included in, for example, the Uniform Resource Identifier (URI).

Webpage 108 includes resources 110. Resource 110 is web content that is uniquely identified by a URI. Resource 110 is included in webpage 108 and may be an image, a JavaScript, a CSS, a downloadable file, etc. In an embodiment, a URI request can also include input parameters from a user. Those input parameters cause web browser 104 to generate a dynamic webpage 108. For example, web server 104 may receive a URI request, such as the request below.

http://example.com/foo.png?a=1&b=2.

The request below includes a URI=http://example.com/foo.png, and input parameters, a and b where a=1 and b=2. Input parameters a and b may be examples of the GET query, described above.

Resources 110 may be stored within a disk storage on web server 104, or another computing device that communicates with web server 104 using network 102 (not shown). A disk storage may be a non-volatile memory storage described in detail in FIG. 6.

Client device 106 is an electronic device capable of requesting and receiving resources 110 over network 102. Example client devices 106 are personal computers, mobile communication devices, (e.g. smartphones, tablet computing devices, notebooks), set-top boxes, game-consoles, embedded systems, and other devices that can send and receive resources 110 over network 102. To display resources 110, client device 106 may execute an application, such as an online web browser or simply browser 116.

Browser 116 accesses webpages 108 from web server 104 and presents webpages 108 to the user using client device 106. In one embodiment, a user uses browser 116 to enter a URI associated with resources 110. In response to entering the URI, browser 116 generates a request that downloads resources 110 from web server 104. Upon receiving the request, web server 104 uses the URI to determine whether resource 110 is available on web server 104. Through the URI associated with requested resource 110, web server 104 may compile multiple resources 110 into webpage 108. Web server 104 transmits resources 110 that are included in webpage 108 to client device 106.

In addition to web browser 116, client device 106 also includes an offline browser 118. Offline browser 118 allows a user to view webpages 108 and resources 110 when client device 106 is offline. Client device 106 is offline when client device 106 does not have a connection to network 102. In an embodiment, client device 106 may also be considered offline when network 102 cannot download resource 110 in a predetermined amount of time. In this embodiment, offline browser 118 presents resource 110 to a user when browser 116 cannot download resource 110 in a predetermined amount of time.

In FIG. 1, resources that are stored on web server 104 are denoted as resources 110, and resources that were downloaded to client device 106 and are displayed by offline browser 118 are denoted as resources 110'.

Webpages 108 may be displayed using offline browser 118 when resources 110' were previously downloaded to client device 106. However, offline web browser 118 may also display webpages 108 from resources 110' that were uploaded to client device 106 from a portable memory device, such as a thumb-drive, or a compact disk, or that may be created by a webpage developer.

In one embodiment, the switch between the presentation of resource 110 using browser 116 and presentation of resource 110' using offline browser 118 is seamless to the user. Offline browser 118 may, however, notify the user that resource 110' is displayed in an offline mode. For example, offline browser 118 may change a color of the URI bar, or display a message, such as "offline mode" on a display screen of client device 106. In another embodiment, a user may be presented with an icon that may be activated to load webpage 108 in an offline mode.

In an embodiment, where client device 106 maintains a slow connection with web server 104, browser 116 may continue to download resource 110 from web server 104, as offline browser 118 displays resource 110' having the same URI. When the download is complete, browser 116 may replace resource 110' that is displayed on client device 106, with the resource 110 that was downloaded from web server 104.

When web browser 116 downloads resources 110 onto client device 106, resources 110 are stored in diskdisk storage 120, as resources 110'. Disk storage 120 is a non-volatile memory associated with offline browser 118, and described in detail in FIG. 6. In an embodiment, a user may configure the size of disk storage 120. For example, the size of disk storage 120 may be configured using preference settings that are displayed to a user upon request. In an embodiment, a user may also configure the maximum size of each resource 110' or the size of webpage 108 that includes resources 110 that may be stored in disk storage 120.

Figure 2:
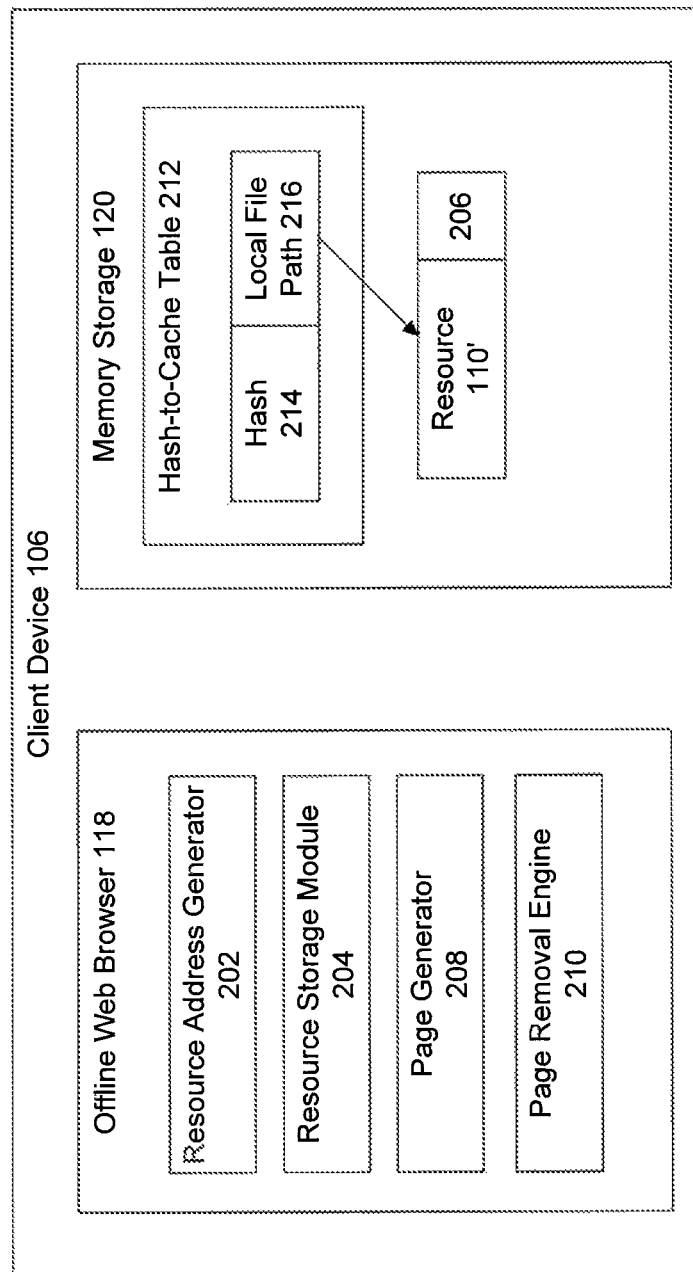
FIG. 2 is a block diagram of an exemplary offline web browser.

FIG. 2 is a block diagram 200 of an offline web browser, according to an embodiment. Offline web browser 118 includes a resource address generator 202, a resource storage module 204, a webpage generator 208 and a webpage removal engine 210.

Resource address generator 202 generates a record for accessing resources 110' on client device 106. The record includes hash 214 and local file path 216. When offline browser 118 stores resources 110', resource address generator 202 generates a local file path 216 for each resource 110'. Local file path 216 identifies the location of resource 110' in disk storage 120.

Resource address generator 202 also generates hash 214 of the URI associated with resource 110'. Resource address generator 202 may generate hash 214 using means known to a person skilled in the relevant art. Once generated, resource address generator 202 stores hash 214 and local file path 216 for each resource 110' in hash-to-cache table 212. Hash-to-cache table 212 is included in disk storage 120, such as a non-volatile memory storage described in detail in FIG. 6.

Resource storage module 204 stores resources 110' in disk storage 120. In one embodiment, resource storage module 204 stores resources 110' at a location identified by local file path 216. In an embodiment, resource 110' may store other resources within resources 110' (not shown). This enables offline browser 118 to display dynamic webpages 108 on client device 106. As described herein, resources 118' may include downloaded files, such as documents in the portable document format (PDF), spreadsheet files, videos, and word documents, to name a few.

In an embodiment, resource storage module 204 stores resources 110' to maximize the number of webpages 108 that are stored and completely displayed by offline browser 118. That is, resource storage module 204 attempts to store a largest number of resources 110' that correspond to the largest number of webpages that can be displayed without a "resource not found" message.

When resource 110' is stored in disk storage 120, resource storage module 204 associates a resource counter 206 with resource 110'. Resource counter 206 indicates the number of different webpages 108 that include resource 110'. For example, the first time resource storage module 204 stores resources 110' in disk storage 120, resource counter 206 may be incremented from zero to one. Subsequently, when resource address generator 202 attempts to insert another copy of the same resource 110' that may be displayed in a same or different webpage, resource address generator 202 may determine that hash 214 associated with resource 110' exists in hash-to-cache table 212. To identify that multiple webpages include resource 110', resource storage module 204 increments resource counter 206 to the next value, for example from one to two. Similarly, when resources 110' included in webpage 108 are removed from disk storage 120 as described below, resource counter 206 may be decremented to identify that resource 110' is displayed in a fewer number of webpages 108 using offline browser 118.

Webpage generator 208 (also referred to as page generator 208) generates offline webpages 108. When offline browser 118 determines that client device 106 does not have a connection to network 102 or that a connection is too slow, offline browser 118 uses page generator 208 to generate webpages 108 from resources 110'. To generate webpages 108, page generator 208 uses resource address generator 202 to generate a hash of resource URI that the user entered using client device 106. Page generator 208 then searches hash-to-cache table 212 for the generated hash. If the hash is found (in other words, the hash matches hash 214 stored in hash-to-cache table 212), page generator 208 uses the hash to obtain local file path 216 that is associated with hash 214. Page generator 208 then uses local file path 216 to retrieve resource 110'.

Page generator 208 then determines whether the retrieved resource 110' includes references to other resources 110'. To determine whether the retrieved resource 110' accesses other resources 110', page generator 208 loads the retrieved resource 110' for display on client device 106. As resource 110' is loaded, the content of resource 110' is loaded into a DOM structure and traversed. As page generator 208 traverses the DOM structure, it identifies whether the retrieved resource 110' includes URIs to other resources 110'. When page generator 208 identifies other resources 110', page generator 208 generates a hash of each of the other resource 110', and, in one embodiment, recursively repeats the process until the complete webpage is loaded.

If page generator 208 cannot find the hash of resource 110' (in other words, the determined hash does not match hash 214), page generator 208 displays a message that resource 110' is not found. Example message may include "problem loading a resource" or "resource not found." In an embodiment, offline browser 118 may display webpage 108 when page generator 208 is unable to find one or more resources 110'. In this case, the places on webpage 108 that include missing resources 110' are left blank or also include an above error message.

Because offline browser 118 is allocated a limited amount of memory, offline browser 118 may remove some resources 110' from the disk storage 120. To remove resources 110', offline browser 118 uses a page removal engine 210. In one embodiment, page removal engine 210 removes resources 110' that a user is unlikely to access in the future. However, since resources 110' may be shared by multiple webpages 108, page removal engine 210 may remove resources 110' in a manner that maximizes the number of complete webpages 108 that offline browser 118 displays on client device 106.

In an embodiment, offline browser 118 may use a least recently used (LRU) algorithm to remove resources 110'. To maximize the complete number of webpages 108 that offline browser 118 displays to a user, the LRU algorithm may be applied to webpages 108 and not resources 110'. It may be noted that this embodiment is different from conventional resource management systems that remove resources that are least likely to be accessed and without considering the number of webpages that may be affected by such removal.

In removing resources 110', page removal engine 210 removes webpages 108 that a user is unlikely to access. Because resources 110' may be shared by multiple webpages 108, page removal engine 210 checks resource counter 206 associated with resource 110' prior to removing resource 110'. When resource counter 206 indicates that resource 110' is not shared with other webpages 108, (when, in one example, the value of resource counter 206 is set to one) resource 110' is removed from disk storage 120. However, when resource counter 206 that is associated with resource 110' indicates that resource 110' is included in other webpages 108 (when, for example, the value of resource counter 206 is set to a value greater than one), page removal engine 210 decrements resource counter 206. Page removal engine 210 checks the value of resource counter 206 of every resource 110' included in webpage 108 that it attempts to remove from disk storage 120, and removes resources 110' of webpage 108 that are not shared with other webpages 108.

In an embodiment, page removal engine 210 balances the size of webpage 108 with the probability that webpage 108 will be accessed on client device 106. To determine the balance between the size of the webpage 108 and the probability of access, page removal engine 210 may use an algorithm, such as that described below.

For example, consider P(s), where P(s) is set of webpages 108, that includes webpages Pi, where i=1, 2, 3, ... n. Each webpage Pi is associated with size Si. Size Si corresponds to the size of all resources 110' included in webpage Pi. Additionally, let Ei be a probability of each webpage Pi being accessed in the future.

Further, let Hi be the access history of webpages 108, where i=1, 2, ... n, such that H1 is the most recently accessed webpage 108, H2 is the next most recently accessed webpage 108, and Hn is the least recently accessed page.

In addition, each webpage 108 may be assigned a history access bonus, bonus(Hi). A history access bonus gives additional weight for keeping or removing webpage 108 from disk storage 120. In one embodiment, the weight of bonus(Hi) may be determined as:

bonus(Hi)=M−i+1 for 1≤i≤M; and bonus(Hi)=0; otherwise where M is a maximum number of sequential past accesses of webpages 108 that are interesting for the purpose of storing webpages 108 in disk storage 120 or an access history threshold. The value of M may be configured within offline browser 118 or may be a function of available space or size of disk storage 120.

Based on the history access bonus, an access score for each webpage 108 (score (Pi)) within M number of webpages 108 is determined. In one embodiment:

$$\text{Access score}(Pi) = \Sigma \text{ bonus } (Hj)$$
$$j = 1 \ldots M; Hj = Pi$$

where access score (Pi) indicates the sum of the access bonus determined for Pi. The probability Ei for accessing webpage 108 in the future, also referred to as the expected access score may then be estimated as:

$$Ei = \text{score}(Pi) \Big/ \sum_{i=1...n} \text{score}(Pi)$$

Page removal engine 210 determines the probability of each webpage 108 being accessed by a user. Page removal engine 210 then removes webpages 108 that have a probability score below a predefined threshold.

In an embodiment, page removal engine 210 also balances the size of disk storage 120 with the probability score of each webpage 108. For example, let the size of disk storage 120 be equal to C. Let Xi be a variable from 0 to 1. The maximum number of webpages 108 of size Si that may be stored in disk storage 120 may be determined as:

$$\max\left(\sum_{i=1}^{n} Xi * Ei\right)$$

under a condition:

$$\sum_{i=1}^{n} Xi * Si < C$$

In the further embodiment, when page removal engine 210 attempts to remove webpages 108 when, for example, disk storage 120 is becoming full or close to size C, the condition may be modified as described below to remove a greater number of webpages 108.

$$\sum_{i=1}^{n} Xi * Si < aC, \text{ where } 0 \leq a \leq 1.$$

The above embodiment for determining webpages 108 that may be stored in disk storage 120 is similar to a "Knapsack" algorithm, which is known to a person skilled in the relevant art. However, other embodiments for determining webpages 108 that may be stored in disk storage 120 may be used. In one embodiment of the example above, when Xi=0 for a particular webpage 108, webpage 108 may be removed from disk storage 120. On the other hand, when Xi=1 for a particular webpage 108, webpage 108 is maintained in disk storage 120.

Figure 3:
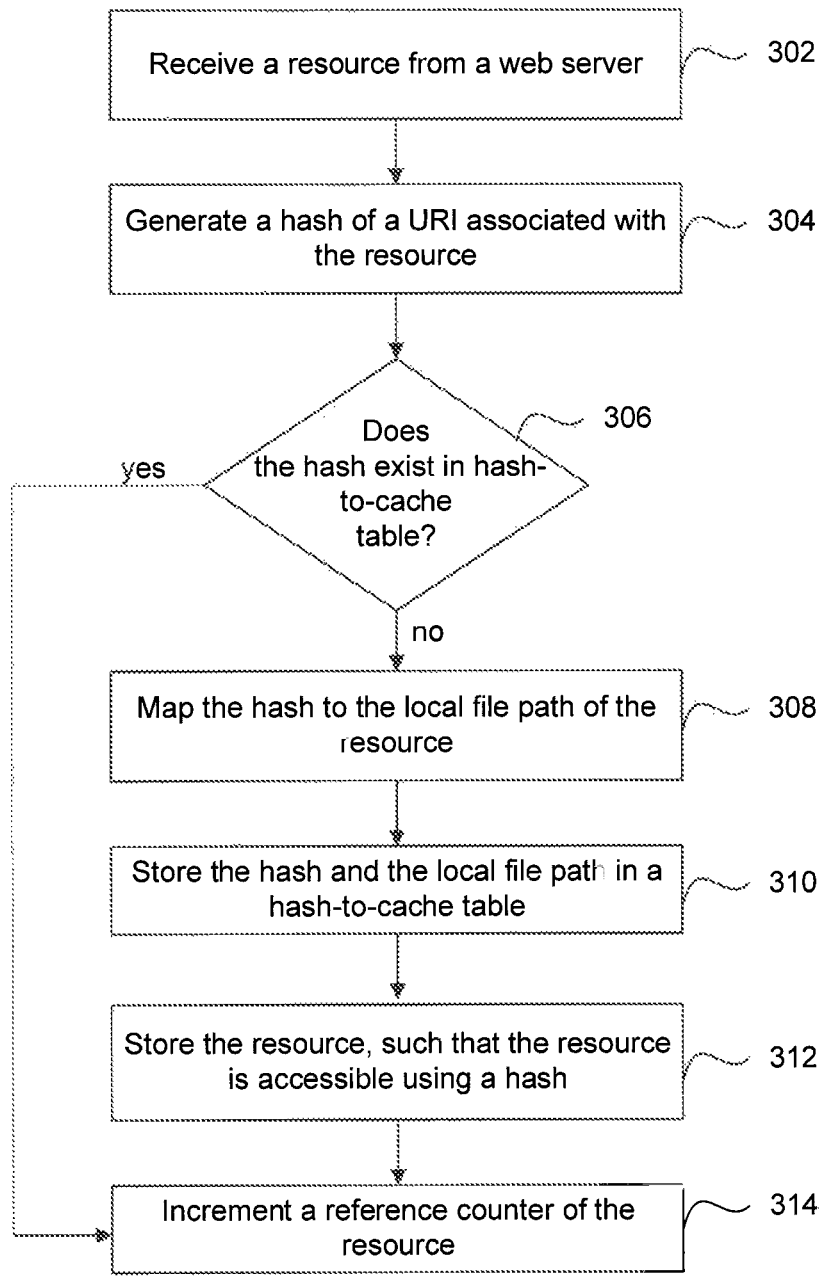
FIG. 3 is a flowchart of a method for storing a resource for access by an offline browser, according to an embodiment.

FIG. 3 is a flowchart of a method 300 for storing resources for access by offline browser.

At stage 302, a resource is provided. For example client device 106 downloads resources 110 from web server 104.

At stage 304, a hash of a URI associated with a resource is generated. For example, resource address generator 202 generates hash 214 of a URI associated with resource 110.

At stage 306, a determination is made whether the hash exists. For example, resource address generator 202 determines whether hash generated in stage 304 exists in hash-to-cache table 212. The determination may be made by traversing the hash-to-cache table 212 using methods known to a person skilled in the relevant art. When hash 214 exists in hash-to-cache table 212, the corresponding resource 110' already exists in disk storage 120 and the flowchart proceeds to stage 314. Otherwise, the flowchart proceeds to stage 308.

At stage 308, a hash is mapped to the location where a resource is stored. For example, hash 214 is mapped to local file path 216 associated with resource 110'. As described herein, local file path 216 identifies the location in disk storage 120 that stores resource 110'.

At stage 310, the hash and the corresponding local file path are stored in a hash-to-cache table. As described herein, hash 214 and the associated local file path 216 are stored in hash-to-cache table 212 so that resource 110 may be accessed using offline browser 118.

At stage 312, the resource is stored. For example, resource 110 is stored as resource 110' in disk storage 120 at a location accessible using local file path 216.

At stage 314, a resource counter is incremented. As described herein, when resource 110' is stored in disk storage 120, resource counter 206 is incremented to keep track of the number of webpages 108 that include resource 110'.

Figure 4:
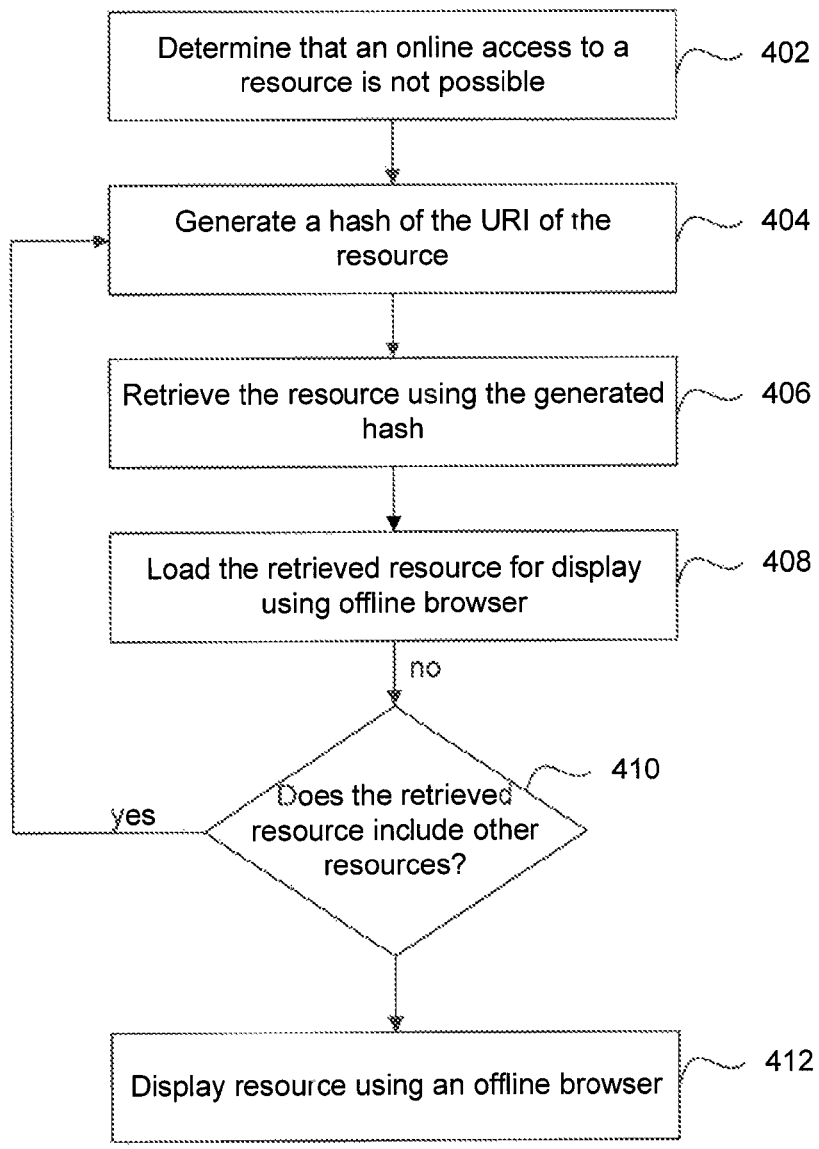
FIG. 4 is a flowchart of a method for retrieving a webpage by an offline browser, according to an embodiment.

FIG. 4 is a flowchart of a method 400 for viewing webpages using an offline browser, according to an embodiment.

At stage 402, a determination is made that online access to a resource is not possible. For example, client device 106 receives a URI from a user and uses browser 116 to retrieve resource 110. However, when a connection to network 102 does not exist or is slow, offline browser 118 may attempt to retrieve resource 110' that corresponds to the URI of webpage 108 from disk storage 120.

At stage 404, a hash of a URI of a resource is generated. Resource address generator 202 generates a hash from a URI that client device 106 receives from a user.

At stage 406, a resource is retrieved. As described herein, page generator 208 searches hash-to-cache table 212 for the hash generated in stage 404. If the hash is found (for example when the hash generated in stage 404 matches hash 214 stored in hash-to-cache table 212) resource 110' exists in disk storage 120. Page generator 208 then uses hash 214 to access local file path 216, and uses local file path 216 to retrieve resource 110' from disk storage 120. If the hash does not exist an error message is displayed and the method ends.

At stage 408, a resource is loaded for display. For example, the retrieved resource 110' is loaded for display and a DOM structure is generated. Page generator 208 then traverses the DOM structure to display resource 110'.

At stage 410, a determination is made whether a resource includes a URI to another resource. For example, as page generator 208 traverses the DOM structure, page generator 208 determines whether resource 110' includes a URI to another resource 110'. When a URI exists, the flowchart proceeds to stage 404 and the resource associated with the URI is retrieved. Otherwise, resource 110' is displayed in stage 412.

Figure 5:
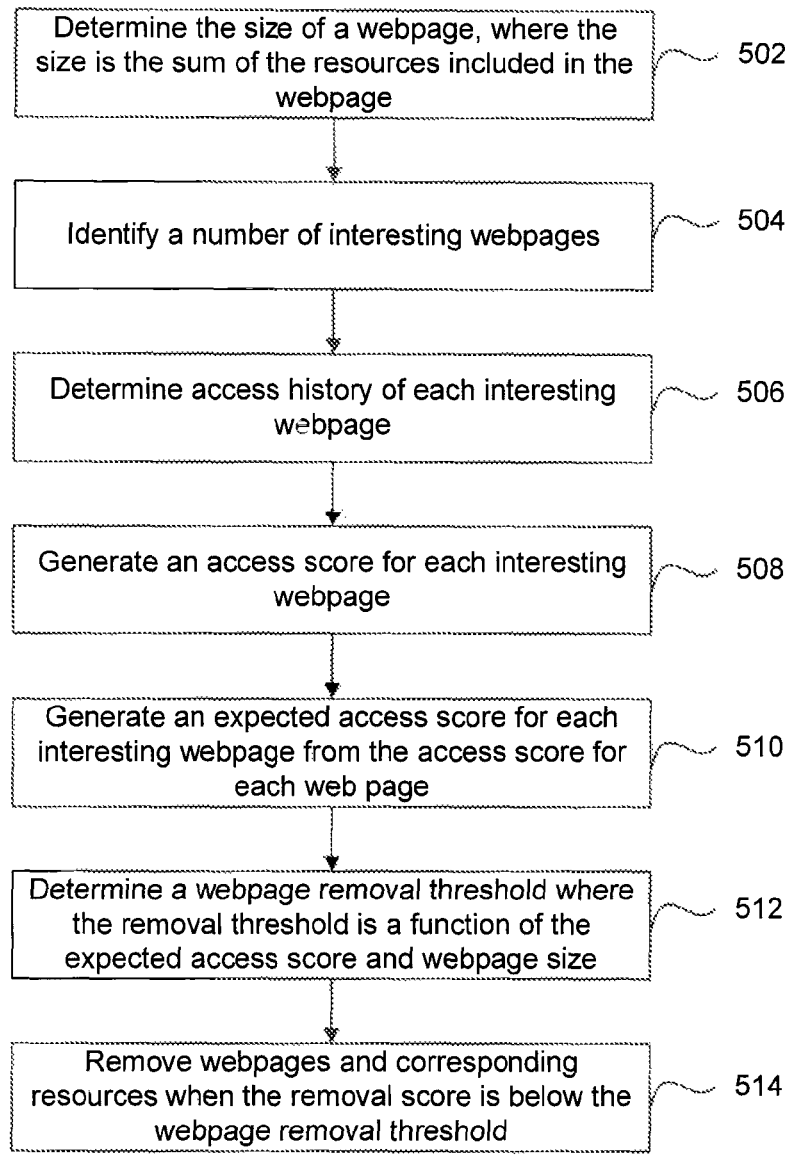
FIG. 5 is a flowchart of a method for removing resources from a memory storage accessible to an offline browser, according to an embodiment.

FIG. 5 is a flowchart of a method 500 for managing resources in a memory storage, according to an embodiment. As described herein, the resources are managed to maximize the number of webpages that may be displayed using offline browser 118.

At stage 502, the size of each webpage is determined. In one embodiment, the size of each webpage 108 is the sum of the size of resources 110' that are included in webpage 108.

At stage 504, interesting webpages is identified. As described herein, interesting webpages are the webpages that have been accessed in the past M accesses made to disk storage 120. As further described herein, the value of M may be pre-configured within of browser 118 or may be a function of the available space or size of disk storage 120.

At stage 506, an access history bonus of each interesting webpage is determined. In one embodiment, page removal engine 210 identifies the order in which each webpage 108 was accessed. In an embodiment, page removal engine 210 identifies an access order up to the interesting number of webpages 108. An access history bonus is then determined based on the order of each webpage 108 in the accessed order.

Webpages 108 that are not included in the interesting number may be assigned an access history bonus of 0.

At stage 508, a webpage access score for each interesting webpage is generated. For example, webpage 108 access score may be a function of the access history bonus and the number of time webpage 108 repeated in the access order.

At stage 510, a probability score for each interesting webpage being accessed in the future is generated. As described herein, the probability score may be the access score of a webpage 108 divided by the sum of accessed scores for all webpages 108 in disk storage 120.

At stage 512, a webpage removal threshold is determined. For example, page removal engine 210 may determine the removable threshold as a function of the probability of each webpage 108 being accessed in the future and the webpage size. In an embodiment, the removable threshold maximizes the number of webpages 108 that are fully displayed by offline browser 118.

At stage 514, webpages are removed, based on the webpage removal threshold. For example, page removal engine 210 removes webpages 108 that have a score below the removable threshold. As page removal engine 210 removes webpages 108 and resources 110' associated with webpages 108, it also checks the value of resource counter 206 to determine whether one or more resources 110' are included in other webpages 108. If resource 110' is included in other webpages 108, page removal engine 210 decrements resource counter 206 associated with resource 110' and continues to store resource 110' in disk storage 120, while removing webpage 108.

Figure 6:
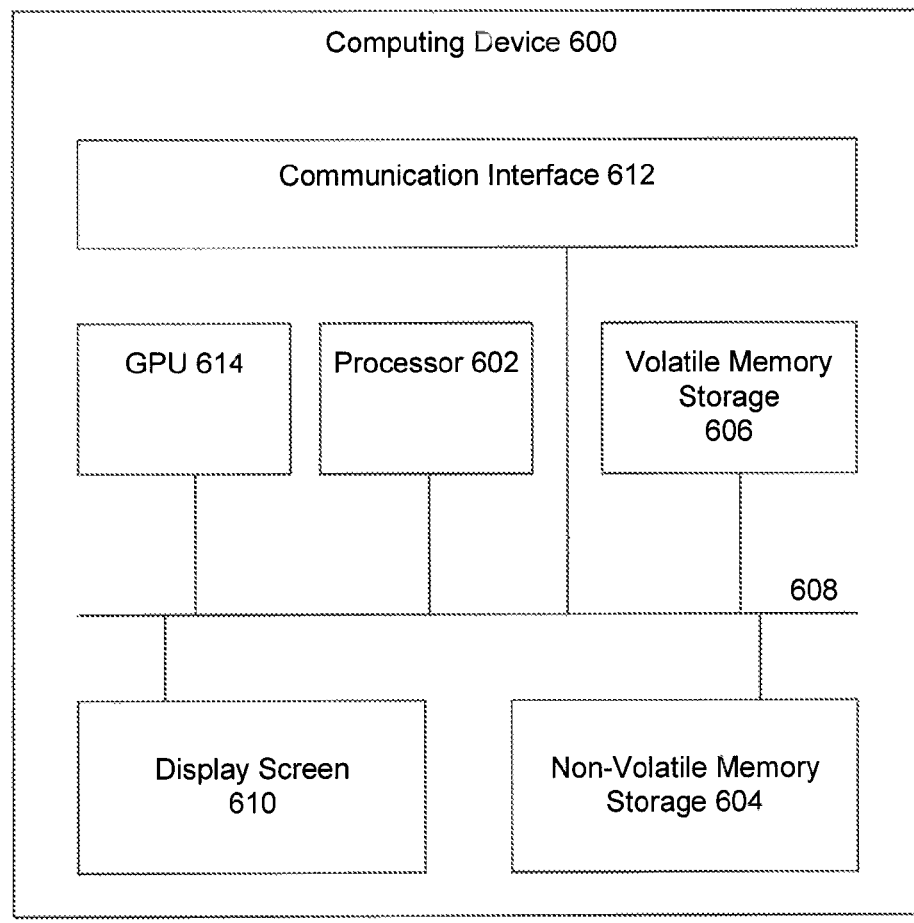
FIG. 6 is a block diagram of an example computer system where embodiments of the invention can be implemented.

FIG. 6 is an example computer system 600 in which embodiments of the present invention, or portions thereof, may be implemented as computer-readable code. For example, the components or modules of system 100 may be implemented in one or more computer systems 600 using hardware, software, firmware, tangible computer-readable media having instructions stored thereon, or a combination thereof and may be implemented in one or more computer systems or other processing systems. Hardware, software, or any combination of such may embody any of the modules and components in FIGS. 1-5.

Web server 104 and client device 106 can include one or more computing devices.

According to an embodiment, web server 104 and client device 106 can include one or more processors 602, one or more non-volatile storage mediums 604, one or more memory devices 606, a communication infrastructure 608, a display screen 610 and a communication interface 612. Processor 602 is not limited to, a digital signal processor (DSP), field programmable gate array (FPGA), and application specific integrated circuit (ASIC). Non-volatile storage 604 can include one or more of a hard disk drive, flash memory, and like devices that can store computer program instructions and data on computer-readable storage media. One or more of non-volatile storage device 604 can be a removable storage device. Memory devices 606 can include one or more volatile memory devices such as, but not limited to, random access memory. Communication infrastructure 608 can include one or more device interconnection buses such as Ethernet, Peripheral Component Interconnect (PCI), and the like.

Typically, computer instructions executing on web server 104 or client device 106 are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. Communications path carries signals and may be implemented using wire or cable, fiber optics, a phone line, a cellular phone link, an RF link or other communications channels.

Embodiments also may be directed to computer program products comprising software stored on any computer-readable storage medium. Such software, when executed in one or more data processing device, causes a data processing device(s) to operate as described herein. Embodiments of the invention employ any computer-useable or readable storage medium. Examples of computer-readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for managing webpages for display on an offline browser, comprising:
   identifying least recently used webpages from a plurality of webpages stored in a disk storage of a client device that is associated with the offline browser, wherein the plurality of webpages includes a plurality of resources and wherein identifying the least recently used webpages further comprises:
   determining a size of each webpage, wherein the size of each webpage is a sum of sizes of resources that are included in each webpage;

determining an access history threshold of the offline browser, wherein the access history threshold is a sequential access of a number of webpages;
determining an access history of each webpage based on the access history threshold;
generating an access score for each webpage, wherein the access score is a function of the determined access history of each webpage;
generating an expected access score for each webpage, wherein the expected access score is a function of the access score of each webpage; and
determining a webpage removal threshold based on the expected access score of each webpage and the size of each webpage; and
removing the least recently used webpages from the disk storage to maximize the display of remaining webpages on the offline browser, wherein the remaining webpages share a subset of resources that are included in the least recently used webpages, and wherein the removing further comprises:
identifying a resource count of the resource included in the least recently used webpages;
decrementing the resource count of a resource; and
removing the resource when the resource count is below the webpage removal threshold.

2. The computer-implemented method of claim 1, farther comprising:
determining a size of the disk storage for storing the plurality of webpages associated with the offline browser; and
removing the least recently used webpages based on the size of the disk storage.

3. The computer-implemented method of claim 1, further comprising:
removing each webpage from the disk storage wherein the access score indicates that each webpage was not accessed within the access history threshold.

4. The computer-implemented method of claim 1, further comprising:
removing the webpages for which the expected access score is outside of the webpage removal threshold.

5. The computer-implemented method of claim 1, wherein the access history threshold is predefined on the client device.

6. The computer-implemented method of claim 1, wherein generating the expected access score further comprises:
dividing the generated access score for each webpage by the sum of access scores of the webpages.

7. The computer-implemented method of claim 1, wherein the webpage removal threshold maximizes the number of webpages stored in the memory storage such that each webpage displays all resources included in the webpage.

8. The computer-implemented method of claim 1, further comprising:
determining a location of the resource in the disk storage based on a hash generated from a uniform resource identifier (URI) of the resource.

9. The computer-implemented method of claim 1, further comprising:
displaying a webpage on the client device using the offline browser; and
receiving an indication for accessing a link within the webpage, wherein a link causes the offline browser to query the disk storage for another resource.

10. A system for managing webpages with an offline browser, comprising:
A processor;
A memory; and
the offline browser stored in the memory and executed by the processor configured to:
identify least recently used webpages from a plurality of webpages stored in a disk storage of a client device that is associated with the offline browser, wherein the plurality of webpages includes a plurality of resources, wherein to identify the least recently used webpages the offline browser is further configured to:
determine a size of each webpage, wherein the size of each webpage is a sum of sizes of resources that are included in each webpage;
determine an access history threshold of the offline browser, wherein the access history threshold is a sequential access of a number of webpages;
determine an access history of each webpage based on the access history threshold;
generate an access score for each webpage, wherein the access score is a function of the determined access history of each webpage;
generate an expected access score for each webpage, wherein the expected access score is a function of the access score of each webpage; and
determine a webpage removal threshold based on the expected access score of each webpage and the size of each webpage; and
remove the least recently used webpages from the disk storage to maximize the display of remaining webpages on the offline browser, wherein the remaining webpages share a subset of resources that are included in the least recently used webpages, and wherein to remove the least recently used webpage the offline browser is further configured to:
identify a resource count of the resource included in the least recently used webpages;
decrement the resource count of the resource; and
remove the resource when the resource count is below the webpage removal threshold.

11. The system of claim 10, wherein the offline browser is further configured to:
determine a size of the disk storage for storing the plurality of webpages associated with the offline browser; and
remove the least recently used webpages based on the size of the disk storage.

12. The system of claim 10, wherein the offline browser is further configured to:
remove each webpage from the disk storage wherein the access score indicates that each webpage was not accessed within the access history threshold.

13. The system of claim 10, wherein the offline browser is further configured to:
remove the webpages for which the expected access score is outside of the webpage removal threshold.

14. The system of claim 10, wherein the access history threshold is predefined on the client device.

15. The system of claim 10, wherein to generate the expected access score the offline browser is further configured to:
divide the generated access score for each webpage by the sum of access scores of the webpages.

16. The system of claim 10, wherein the webpage removal threshold maximizes the number of webpages stored in the memory storage such that each webpage displays all resources included in the webpage.

17. The system of claim 10, wherein the offline browser is further configured to:

determine a location of the resource in the disk storage based on a hash generated from a uniform resource identifier (URI) of the resource.

18. The system of claim 10, wherein to generate the expected access score, the offline browser is further configured to:
display a webpage on the client device using the offline browser; and
receive an indication for accessing a link within the webpage, wherein a link causes the offline browser to query the disk storage for another resource.

19. An article of manufacture including a non-transitory computer-readable storage medium having instructions stored thereon that, when executed by a computing device, cause the computing device to perform operations for managing webpages with an offline browser, the operations comprising:
identifying least recently used webpages from a plurality of webpages stored in a disk storage of a client device that is associated with the offline browser, wherein the plurality of webpages includes a plurality of resources, and wherein the instructions that perform operations for identifying the least recently used webpages within the offline browser further comprise instructions that perform operations comprising:
determining a size of each webpage, wherein the size of each webpage is a sum of sizes of resources that are included in each webpage;
determining an access history threshold of the offline browser, wherein the access history threshold is a sequential access of a number of webpages;
determining an access history of each webpage based on the access history threshold;
generating an access score for each webpage, wherein the access score is a function of the determined access history of each webpage;
generating an expected access score for each webpage, wherein the expected access score is a function of the access score of each webpage; and
determining a webpage removal threshold based on the expected access score of each webpage and the size of each webpage; and
removing the least recently used webpages from the disk storage to maximize the display of remaining webpages on the offline browser, wherein the remaining webpages share a subset of resources that are included in the least recently used webpages, and wherein the removing further comprises:
identifying a resource count of a resource included in the least recently used webpages;
decrementing the resource count of the resource; and
removing the resource when the resource count is below a predefined threshold.

20. The computer-readable storage medium of claim 19, wherein the instructions that perform operations for managing webpages within the offline browser further comprise instructions that perform operations comprising:
determining a size of flue disk storage for storing the plurality of webpages associated with the offline browser; and
removing the least recently used webpages based on the size of the disk storage.

21. The computer-readable storage medium of claim 19, wherein the instructions that perform operations for managing webpages within the offline browser further comprise instructions that perform operations comprising:
removing each webpage from the disk storage wherein the access score indicates that each webpage was not accessed within the access history threshold.

22. The computer-readable storage medium of claim 19, wherein the instructions that perform operations for managing webpages within the offline browser further comprise instructions that perform operations comprising:
removing the webpages for which the expected access score is outside of the webpage removal threshold.

23. The computer-readable storage medium of claim 19, wherein the instructions that perform operations for generating the expected access score further comprise instructions that perform operations comprising:
dividing the generated access score for each webpage by the sum of access scores of the webpages.

24. The computer-readable storage medium of claim 19, wherein the instructions that perform operations for managing webpages within the offline browser further comprise instructions that perform operations comprising: determining a location of the resource in the disk storage based on a hash generated from a uniform resource identifier (URI) of the resource.

25. The computer-readable storage medium of claim 19, wherein the instructions that perform operations for managing webpages within the offline browser farther comprise instructions that perform operations comprising:
displaying a webpage on the client device; and
receiving an indication for accessing a link within the webpage, wherein a link causes the offline browser to query the disk storage for another resource.

* * * * *

UNITED STATES PATENT AND TRADEMARK OFFICE
CERTIFICATE OF CORRECTION

| | | |
|---|---|---|
| PATENT NO. | : 8,832,275 B1 | Page 1 of 1 |
| APPLICATION NO. | : 13/436077 | |
| DATED | : September 9, 2014 | |
| INVENTOR(S) | : Kentaro Hara | |

It is certified that error appears in the above-identified patent and that said Letters Patent is hereby corrected as shown below:

In the Claims

Column 11, line 66, please replace "A processor" with --a processor--.

Column 11, line 67, please replace "A memory" with --a memory--.

Signed and Sealed this
Nineteenth Day of May, 2015

Michelle K. Lee
*Director of the United States Patent and Trademark Office*